United States Patent [19]

Hishinuma

[11] Patent Number: 4,807,215
[45] Date of Patent: Feb. 21, 1989

[54] FLOPPY DISC LOADING APPARATUS

[75] Inventor: Takashi Hishinuma, Kanagawa, Japan

[73] Assignee: Sony Corporation, Tokyo, Japan

[21] Appl. No.: 115,045

[22] Filed: Oct. 30, 1987

[30] Foreign Application Priority Data

Oct. 31, 1986 [JP] Japan .................. 61-259913

[51] Int. Cl.$^4$ .............. G11B 23/02; G11B 17/04
[52] U.S. Cl. .............................. 369/77.2; 369/292
[58] Field of Search ............ 369/75.2, 77.2, 77.1, 369/292

[56] References Cited

U.S. PATENT DOCUMENTS

| 4,513,409 | 4/1985 | Staar | 369/77.1 |
| 4,707,821 | 11/1987 | Verhagen | 369/291 |
| 4,710,831 | 12/1987 | Nishimura | 369/77.2 |
| 4,731,775 | 3/1988 | Katsuyama et al. | 369/77.2 |
| 4,736,358 | 4/1988 | Hoshi et al. | 369/77.2 |

Primary Examiner—Steven L. Stephan

[57] ABSTRACT

A disc loading apparatus has a main chassis having a disc spindle and a signal transducer, a slide chassis slidably provided on the main chassis, a disc holder spring-biased towards the main chassis for inserting a disc cassette for recording and/or reproducing operation and a rotatable arm provided on the main chassis and cooperating with the slide chassis at an arc cam formed on the rotatable arm, the rotatable arm being rotated against a spring force by the insertion of the disc cartridge into the disc holder. There are further provided a center core pressing arm provided on the disc holder and spring-biased towards said main chassis for pressing a center core of the disc cassette towards the disc spindle of the main chassis at one time when the disc holder moves down to the main chassis in accordance with the rotational movement of the rotatable arm and a protect arm cooperating with the rotatable arm and the center core pressing arm for preventing an erroneous pressing action of the center core pressing arm to the center core. Accordingly, upon recording and/or reproducing, upon mis-operation of the eject member, and upon unloading, the magnetic disc can be rotated and unloaded positively and smoothly.

4 Claims, 8 Drawing Sheets

FLOPPY DISC LOADING APPARATUS

BACKGROUND OF THE INVENTION

1. Field of the Invention

The present invention relates generally to loading apparatus and, more particularly, is directed to a disc loading apparatus for use in a recording and/or reproducing apparatus using a recording medium such as a rotary magnetic disc, a floppy disc or others.

2. Description of the Prior Art

A disc loading apparatus for use with a recording and/or reproducing apparatus, for example, a magnetic recording and/or reproducing apparatus using a rotary magnetic disc is disclosed in Japanese Laid-Open Gazette No. 59-177775.

In this conventional disc loading apparatus, a disc holder for holding a disc cassette or a magnetic sheet or disc having a center core is so arranged as to be lowered to or lifted from a disc spindle. A rotatable arm having a bent end portion to contact with the center core is pivotally provided on a main chassis in correspondence with the disc holder. When the disc holder is lowered, the rotatable arm is rotated downward through a linking member to press the center core by its bent end portion, whereby the center core is forcibly engaged with the disc spindle. After he center core is engaged with the disc spindle, the rotatable arm is spring-biased to disengage from the center core by a spring force of a tension spring extended between the rotatable arm and the main chassis.

In the thus constructed conventional disc loading apparatus, the rotatable arm for pressing the center core of the magnetic disc to the disc spindle is only lifted up by the tension spring to be spaced from the disc holder upon non-use, so that when the spring force of the tension spring is lowered or when a large vibration acts on the disc loading apparatus, the rotatable arm is moved toward the main chassis and the bent end portion thereof enters into the inside of the disc holder, thus obstructing insertion of the disc cassette into the disc holder. Also, when the center core is engaged with the disc spindle, this bent end portion contacts with the center core, obstructing the rotation of the center core or magnetic disc. Furthermore, when the disc cassette of the disc is unloaded from the disc spindle and the disc cassette is ejected from the disc holder, if the disc holder is moved upward from the disc holder at a wrong timing relationship, the eject operation of the disc cassette is hindered to cause trouble in the disc loading apparatus.

OBJECTS AND SUMMARY OF THE INVENTION

Accordingly, it is a general object of this invention to provide an improved disc loading apparatus.

It is an object of this invention to provide an improved disc loading apparatus for use with a recording and/or reproducing apparatus.

It is another object of this invention to provide a disc loading apparatus in which when not in use, a center core pressing arm can be locked such that it is positively disengaged from the center core of the magnetic disc.

It is a further object of this invention to provide a disc loading apparatus for use with a recording and/or reproducing apparatus wherein a disc holder contacts or is spaced apart from a disc rotating member and the disc cassette ejecting operation from the disc holder can be carried out positively, with proper timing.

According to one aspect of the present invention, there is provided a disc loading apparatus comprising:

(a) a main chassis having a disc spindle and a signal transducer;

(b) a slide chassis slidably provided on said main chassis;

(c) a disc holder spring-biased towards said main chassis for inserting a disc cassette upon recording and-/or reproducing operation; and (d) a rotatable arm provided on said main chassis and linked with said slide chassis at an arc cam formed at said rotatable arm, said rotatable arm being rotated against a spring force by the insertion of the disc cartridge into said disc holder.

These and other objects, features and advantages of the present invention will become apparent from the following detailed description of the preferred embodiment to be taken in conjunction with the accompanying drawings, throughout which like reference numerals identify like elements and parts.

DESCRIPTION OF THE PREFERRED EMBODIMENT

Figure 1:
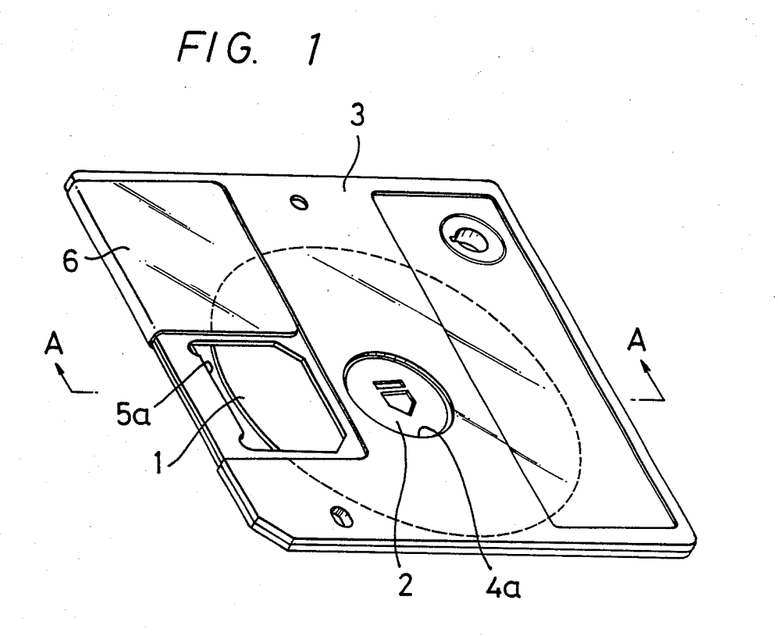
FIG. 1 is a perspective view illustrating an example of a disc cartridge which is used in the present invention.

Prior to the description of an embodiment of a disc loading apparatus according to the present invention, an example of a disc cartridge or disc cassette which is used in the invention will be described in brief with reference to FIGS. 1 and 2. FIG. 1 is a perspective view of such a disc cartridge and FIG. 2 is a cross-sectional view taken along a Line A—A of FIG. 1.

Figure 2:
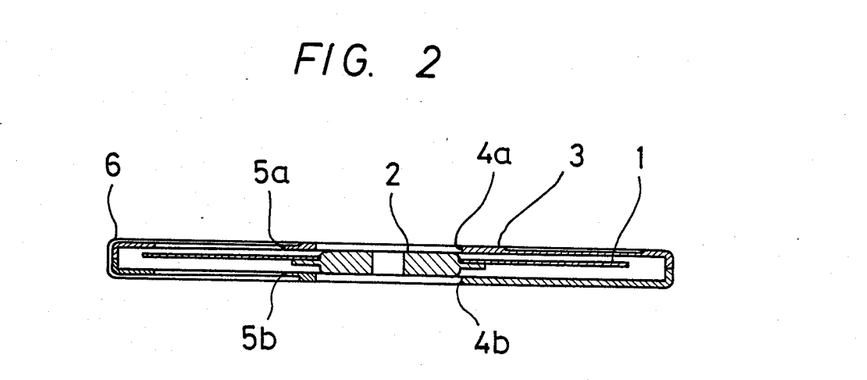
FIG. 2 is a cross-sectional view taken along a line A—A in FIG. 1.

Referring to FIGS. 1 and 2, there is shown a magnetic disc (or sheet) 1 which may be, by way of example, a recording and/or reproducing disc or a floppy disc. The magnetic disc 1 is fixed to a center core 2 and is kept within a disc cartridge 3. The disc cartridge 3 is of a flat-shaped housing and has two circular openings 4a, 4b formed through upper and lower housing members at their central portions. The two circular openings 4a, 4b face the center core 2 and accept a disc spindle as a rotating drive section and a pushing projection of a center core pressing arm which will be described later. Further, the disc cartridge 3 has windows 5a, 5b formed through the upper and lower housing members at one side thereof. The windows 5a,5b allow a signal transducer or magnetic head and a pad member to be inserted thereinto as will be described later. Also, the windows 5a, 5b permit a part of the magnetic disc 1 to be exposed to the outside and are opened and/or closed by a shutter 6. The shutter 6 is slidably carried by the disc cartridge 3. Then, being stably kept within the disc cartridge 3 as mentioned above, the magnetic disc 1 is loaded onto a recording and/or reproducing apparatus (not shown) by a disc loading apparatus which will be described later and the recording and/or reproducing operation may be made conventionally.

Now, an embodiment of a disc loading apparatus according to the present invention will hereafter be described with reference to FIGS. 3 to 9.

Figure 7:
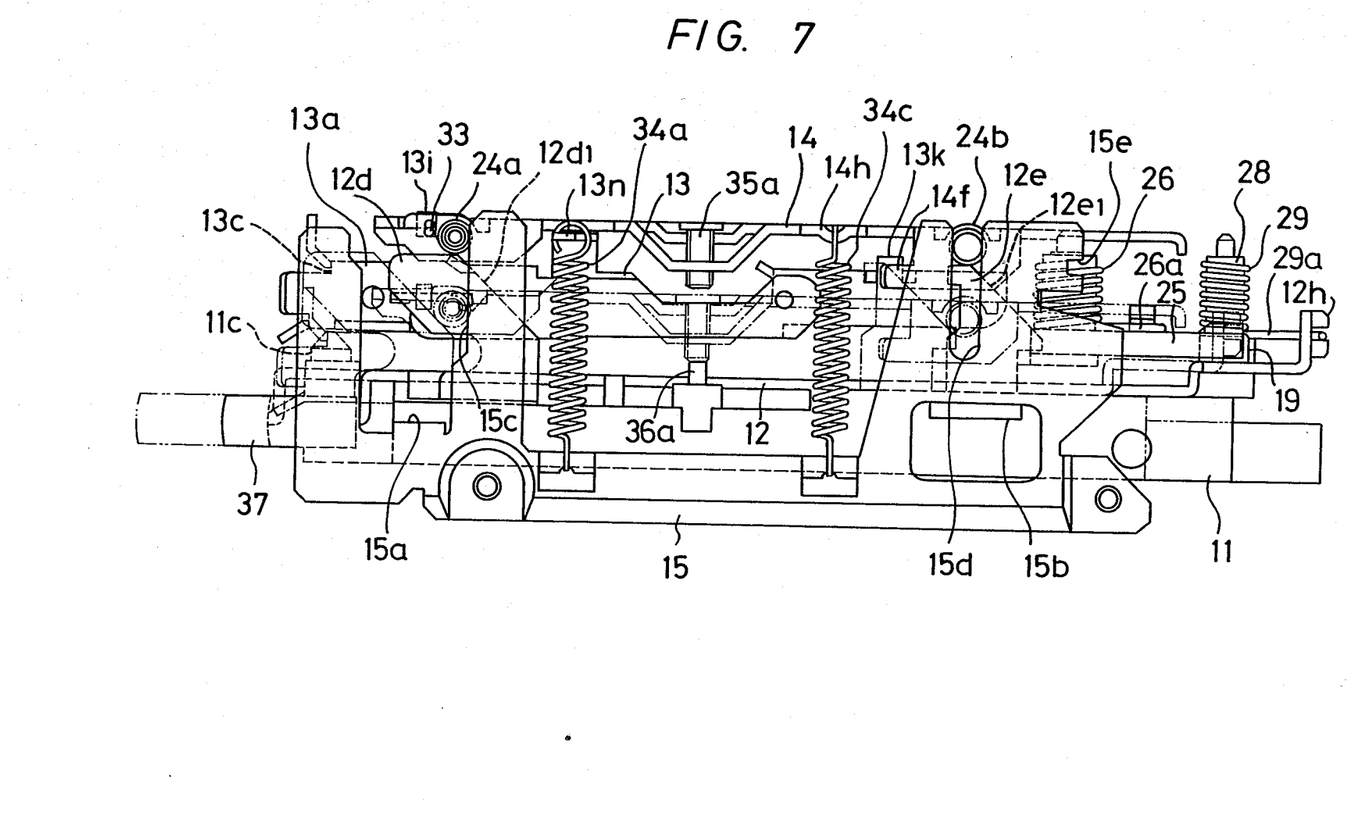
FIG. 7 is a side view showing an assembled state of the embodiment of the disc loading apparatus according to the present invention.
Figure 8:
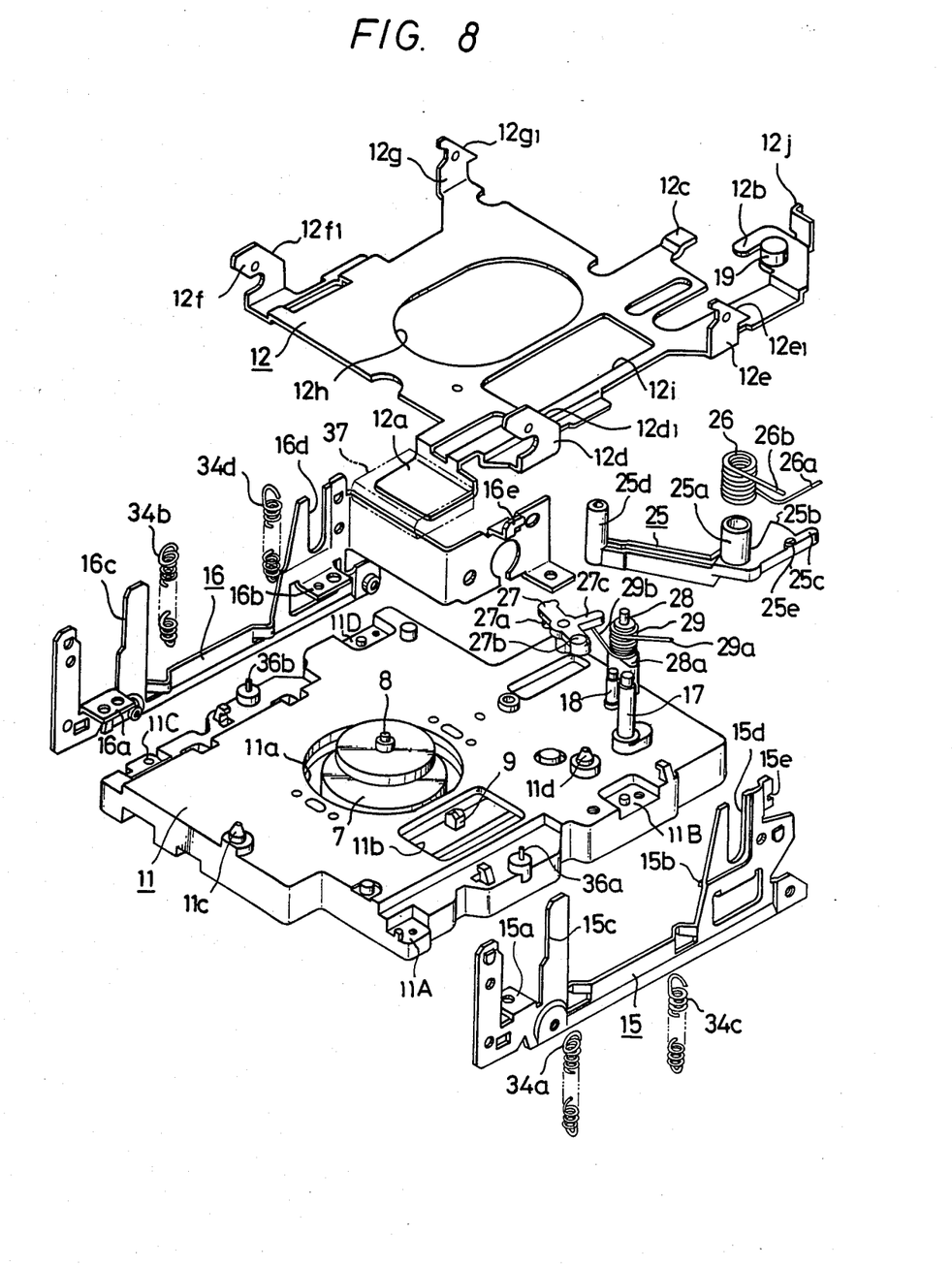
FIG. 8 is an exploded perspective view illustrating a main chassis and a slide chassis of the disc loading apparatus according to the present invention.
Figure 9:
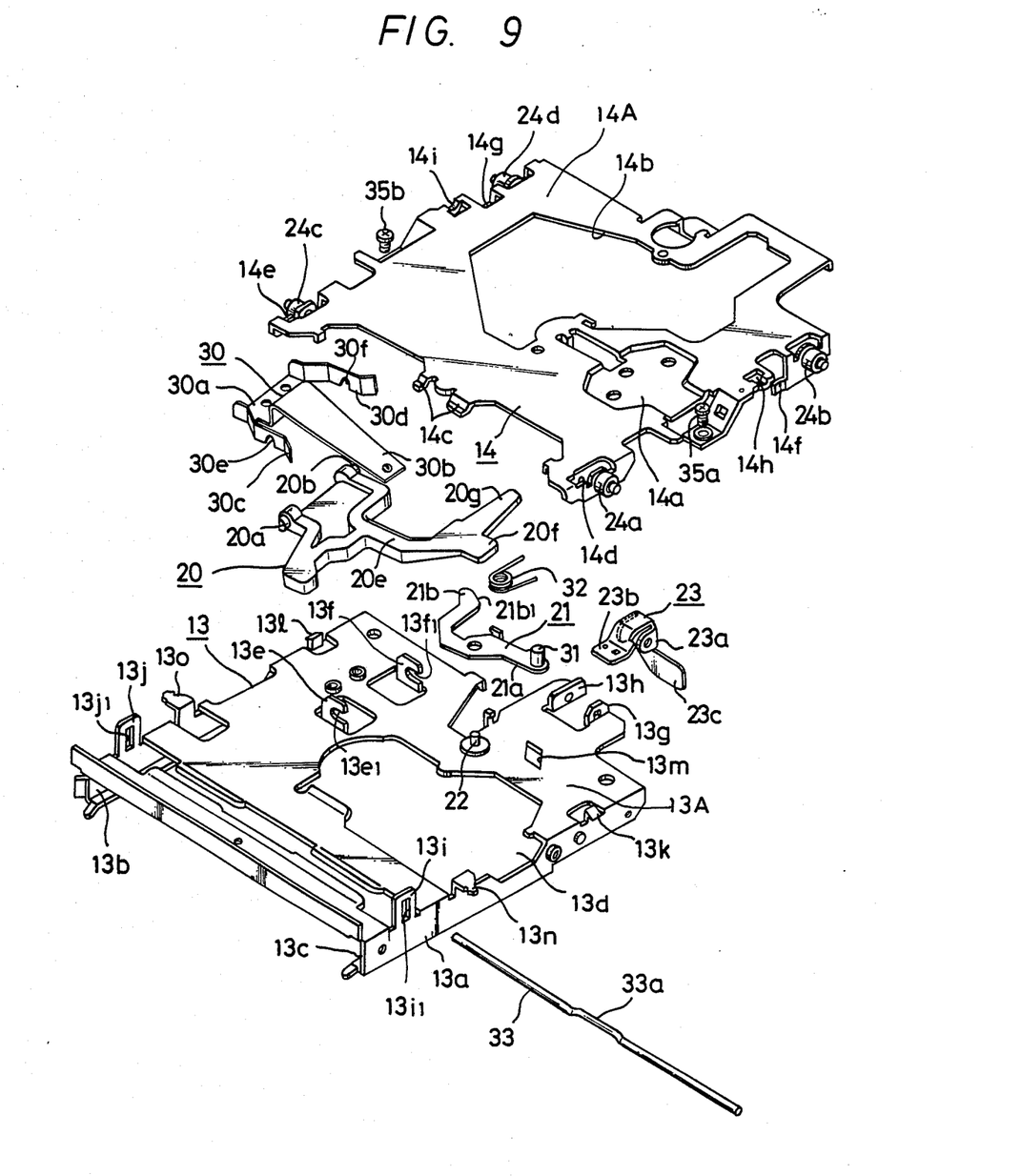
FIG. 9 is an exploded perspective view illustrating a disc holder and a pad plate portion of the disc loading apparatus according to the present invention.

As illustrated in FIGS. 8 and 9 each forming an exploded perspective view, the disc loading apparatus of this embodiment mainly comprises a main chassis 11 on which a slide chassis 12, a disc holder 13 and a pad plate 14 are assembled in this order and they are supported by side plates 15, 16 therebetween, as shown in FIG. 7.

As FIG. 8 shows, a central opening 11a is formed through the main chassis 11 at its central portion to expose upwards therethrough a disc spindle 8 of a drive motor 7 which rotates the magnetic disc 1. In the vicinity of the central opening 11a, a window aperture 11b is formed through the main chassis 11 to enable a magnetic head 9 to move freely therein. Pins 17,18 are implanted on the rear portion of the main chassis 11 to pivotally support interlocking mechanism members which will be described later.

The slide chassis 12 comprises a pressing piece member 12a, a hook-shaped pushing piece member 12b, a protrusion 12c, skewed cams 12d, 12e, 12f and 12g, central opening 12h and a window aperture 12i. The pressing piece member 12a is elongated forward from one side portion of the front edge of the slide chassis 12. The hook-shaped pushing piece member 12b is elongated upwards and forwards from one side portion of the rear edge of the slide chassis 12 and the protrusion 12c is elongated upwards and backwards near the central portion of the rear edge of the slide chassis 12. The skewed cams 12d, 12e, 12f, and 12g are vertically erected from the front and rear portions of the side edges of the slide chasis 12. The rear edges of these skewed cams 12d, 12e, 12f and 12g are respectively inclined backwards to form inclined or skewed rear edges 12d1, 12e1, 12f1 and 12g1. A central opening 12h and a window aperture 12i are respectively formed through the slide chassis 12 as an elliptically-shaped opening and a rectangular-shaped opening to correspond to the central opening 11a and the window aperture 11b of the main chassis 11. An engagement protrusion or cam follower 19 projects from the nearby portion of the hook-shaped pushing piece member 12b.

Referring to FIG. 9, the disc holder 13 has side wall portions 13a, 13b each being bent downwards from its flat portion 13A. The lower edges of the side wall portions 13a, 13b are bent inwardly and, the front edge portions of the side wall portions 13a, 13b and the above inwardly-bent portions thereof are outwardly extended and curved to thereby form an insertion frame portion 13c through which the disc cartridge 3 of the magnetic disc 1 is inserted. A single window 13d is formed through the flat portion 13a of the disc holder 13 from its central portion to one side portion to oppose both the central opening 11a and the window aperture 11b of the main chassis 11. Bearing members 13e, 13f are formed on the flat portion 13a near the inner end side of the window 13d to rotatably support a center core pressing arm 20. A pin 22 is formed on the flat portion 13a at the rear portion of the window 13D to pivotally support a lock lever 21. Further, bearing members 13g, 13h are formed side-by-side on the flat portion 13A of the disc holder 13 at its rear edge portion to pivotally support a pushing-up lever 23. Bearing members 13i, 13j are erected from the front portions of both side portions of the disc holder 13 which have formed therethrough rectangular-shaped openings 13i1, 13j1 long in the vertical direction. A coupling shaft 33 is inserted into these rectangular-shaped openings 13i1, 13j1, and 13j1 as will be described later. In addition, hook-shaped portions 13k, 13l are formed on the rear portion of both side portions of the disc holder 13.

As illustrated in FIG. 9, the pad plate 14 has formed on its flat surface portion 14A a pad mounting portion 14a and a large window 14b corresponding to the window 11b of the main chassis 11. Rollers 24a, 24b, 24c and 24d are pivotally supported at the front and rear portions of the side walls of the pad plate 14 to correspond to the skewed cams 12d, 12e, 12f and 12g of the slide chassis 12. An engagement member 14c protrudes from the front edge of the portion 14A of the pad plate 14 at substantially its central portion.

Turning back to FIG. 8, fixed portions 15a, 15b and 16a, 16b are respectively formed at the front and rear portions of the side plates 15,16. The side plates 15,16 are fixed to the main chassis 11 by fixing the fixed portions 15a, 15b and 16a, 16b to concaved portions 11A, 11B and 11C, 11D formed on the main chassis 11 at the corresponding positions by small screws (not shown). Further, guide portions 15c, 15d, 16c and 16d are formed to be vertically elongated upward from the side plates 15, 16 to guide the rollers 24a, 24b, 24c, and 24d shown in FIG. 9.

A rotatable arm 25, which will be used to push out the disc cartridge 3, is pivotally supported by the support pin 17 of the main chassis 11 at a position in which it is above the upper surface of the slide chassis 12. The rotatable arm 25 is formed as a substantially L-shaped arm whose arm spreads from a tubular-shaped shaft support portion 25a. An arc-shaped cam 25b and projection portions 25c are formed on the end portion of one of the arms of the V-shaped rotatable arm 25. The arc-shaped cam 25b slidably contacts with the engagement projection 19 of the slide chassis 12 and the engage projected portion 25c is formed substantially perpendicular to the arc-shaped cam 25b to contact with the engage projection 19 from the outside. The other of the half arms of the V-shaped rotatable arm 25 is elongated up to near the central portion of the main chassis 11, and a pushing projection 25d is erected from the end portion of the elongated half arm of the rotatable arm 25. A coil portion of a torsion spring 26 is mounted on the central shaft support portion 25a of the rotatable arm 25. One end 26a of the torsion spring 26 is engaged with portion 25e formed on the projection portion 25c, whereas the other end 26b of the torsion spring 26 is engaged with portion 15e formed on one side plate 15 so that one half arm portion of the V-shaped rotatable arm 25 is biased to always rotate forwards, or to the central portion of the main chassis 11. A substantially T-shaped press arm 27 is rotatably supported by the support pin 18 formed on the main chassis 11. The T-shaped press arm 27 is formed of a contact protrusion 27a protruded downward from one end of the horizontal portion thereof to oppose the projected portion 12c of the slide chassis 12, a projection 27b erected upwards from the front edge of the other end thereof to oppose the lift up arm 23 (see FIG. 9) pivoted to the disc holder 13 and a vertical edge portion 27c. The vertical edge portion 27c contacts with a projected edge portion 28a formed at a pin 28 to restrict the rotatable range of the T-shaped press arm 27. The pin 28 is formed on the main chassis 11 near the pin 18 to support a spring as will be explained below.

The pin 28 is engaged with a coil portion of a torsion spring 29. One end 29a of the torsion spring 29 is engaged with an engage portion 12j formed at the rear end portion of the slide chassis 12 and the other end 29b thereof is engaged with an engage portion 16e of the side plate 16 to always bias the slide chassis 12 to slidably move forwards.

Pins 11c, 11d are implanted on the main chassis 11 at its front and rear portions to restrict the back and forth sliding movements of the slide chassis 12.

The center core pressing arm 20 is pivoted by the bearing portions 13e, 13f of the disc holder 13 so as to freely rotate in the up and down direction in face of the window opening 13d. The center core pressing arm 20 includes shaft projections 20a, 20b projected from side surfaces of the base portion thereof, projections 20c, 20d (see FIG. 5) projecting from the lower surface of the free end thereof, an arm portion 20e extending forward from the free end portion thereof, a pushing surface 20f, formed at the top of the arm portion 20e and another pushing arm 20g formed at the side edge of the pushing surface 20f. The shaft projections 20a, 20b have tapered surface portions 20a1, 20b1, at their rear portion (see FIGS. 3 and 4). The projections 20c, 20d (See FIGS. 3 to 5) are adapted to contact with the center core 2 through the opening 4a of the disc cartridge 3. The center core pressing arm 20 is always spring-biased towards the main chassis 11 by a leaf spring member 30.

Figure 3:
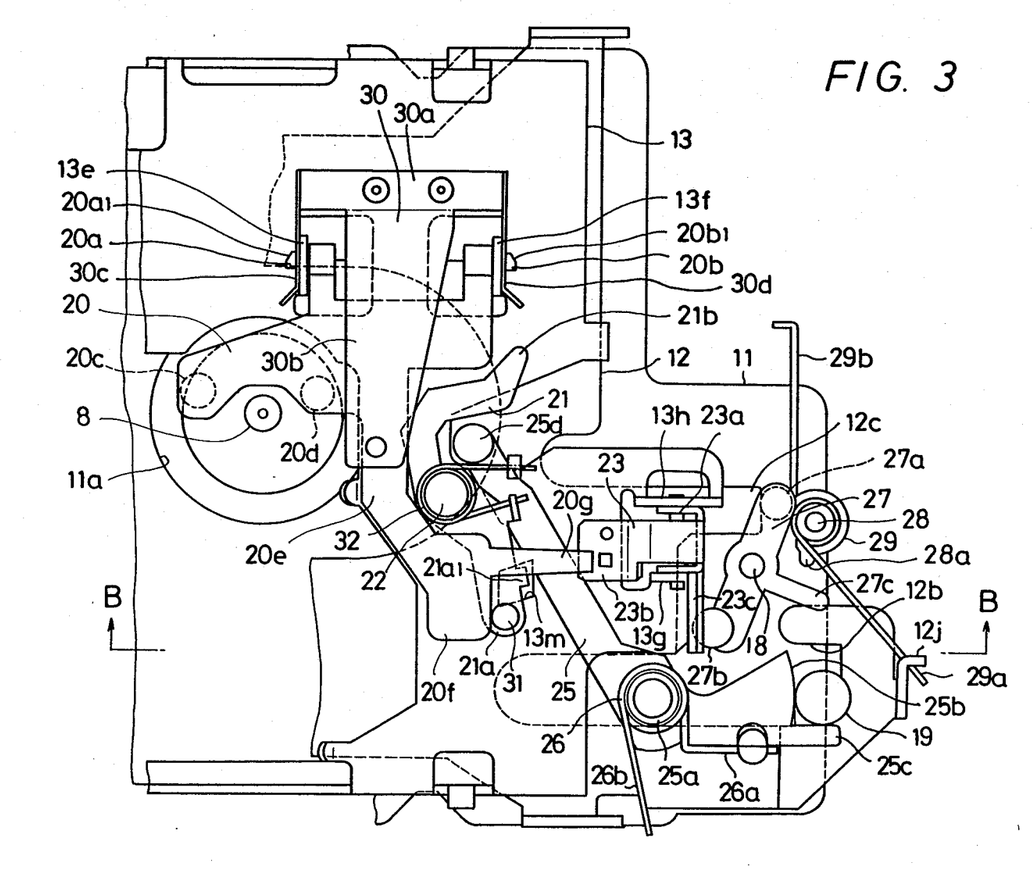
FIG. 3 is a plan view of a main portion of an embodiment of a disc loading apparatus according to the present invention.
Figure 4:
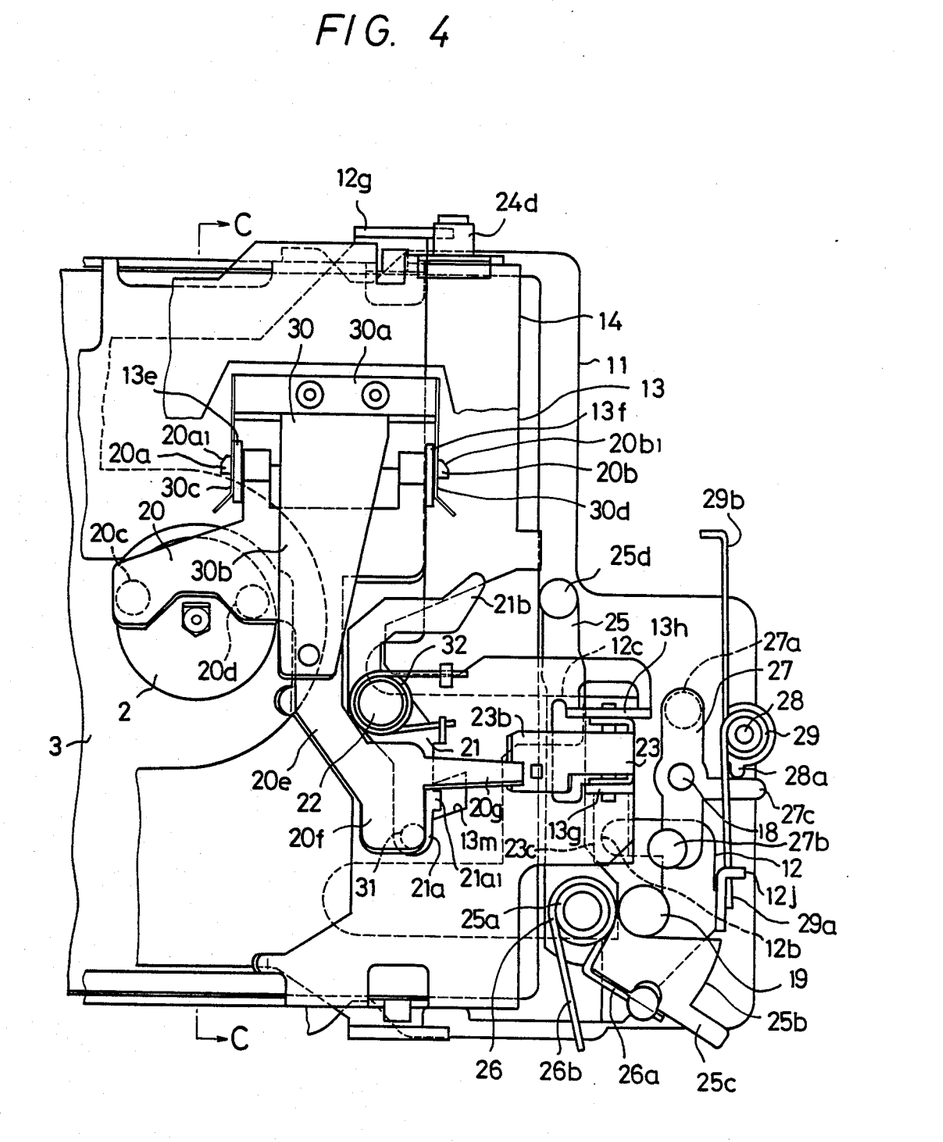
FIG. 4 is a plan view illustrating the operation state of the disc loading apparatus shown in FIG. 3.

As shown in FIG. 9, the leaf spring member 30 is formed of a base end portion 30a, a pressing spring member 30b elongated from the base end portion 30a and bent resilient support members 30c, 30d elongated from both side portions of the base end portion 30a. The tops of the resilient support members 30c, 30d are curved outwardly, and cut-away concaved portions 30e, 30f are formed through the resilient support members 30c, 30d at their lower edge sides of the central portions. The leaf spring member 30 is mounted on the disc holder 13 by fixing the base end portion 30a behind the bearing members 13e, 13f of the disc holder 13 as shown in FIGS. 3 and 4. Then, both of the resilient support members 30c, 30d of this leaf spring member 30, are made in contact with the side surfaces of the bearing members 13e, 13f, respectively. Under this state, engage concaved portions 13e1, 13f1, of the bearing members 13e, 13f having recesses opened forward and the cut-away concaved portions 30e, 30f of the resilient support members 30c, 30d are linked with one another to form shaft openings. The above-mentioned shaft projections 20a, 20b of the center core pressing arm 20 are engaged into the thus formed shaft openings to enable the arm 20 to freely rotate in the up and down direction.

The engagement of the shaft projections 20a, 20b of the arm 20 into these shaft openings will be described more fully. Both the shaft projections 20a, 20b contact with the outwardly-curved top portions of the bent resilient support members 30c, 30d from one side portions of the bearing members 13e,13f. In this state, if the shaft projections 20a, 20b are pushed into the side of the base portion 30a of the leaf spring member 30, the resilient support members 30c, 30d are spread outwardly to permit both the shaft projections 20a, 20b to be inserted into the engaging concave portions 13e1, 13f1 of the bearing members 13e, 13f. When the shaft projections 20a, 20b are inserted into the innermost end portions of the concave portions 13e1, 13f1, they are opposed to the cut-away concave portions 30e, 30f of the bent resilient support members 30c, 30d. As a result, due to their biasing forces, the bent resilient support members 30c, 30d contact with the bearing members 13e, 13f to support the shaft projections 20a, 20b with the aid of the bearing members 13e, 13f. In other words, the cut-away portions 30e, 30f and the cut-away portions 13e1, 13f1 cooperate in the axial direction to form the shaft openings by which the shaft projections 20a, 20b are supported rotatably. As a result, the center core pressing arm 20 is able to rotate around the bearing members 13e, 13f in the up and down direction. Under this condition, the center core pressing arm 20 is pressed downwardly by the press spring member 30b of the leaf spring member 30 and is always biased downward.

Referring to FIG. 9, the protect arm 21 is formed as a hook-shaped arm and is pivotally supported at its central portion on the supporting pin 22 formed on the disc holder 13. A projection 31 is implanted on one end portion 21a of the protect arm 21 in correspondence with the pressing surface portion 20f of the center core pressing arm 20. On the other end portion 21b of the protect arm 21, there is formed a contact portion 21b1 which abuts against the pushing projection 25d of the rotatable arm 25 (see FIG. 8) when one half portion of the rotatable arm 25 is rotated forward. The protect arm 21 is rotatably spring-biased by a torsion spring 32 such that its one end portion 21a is always moved under the pressing surface portion 20f of the center core pressing arm 20. The rotatable range of the protect arm 21 is confined within a range in which the engage member 21a1 (see FIGS. 3 and 5) formed at the side edge of the one end portion 21a of the protect arm 21 can move within a restricted window 13m formed through the flat portion 13A of the disc holder 13.

Figure 5:
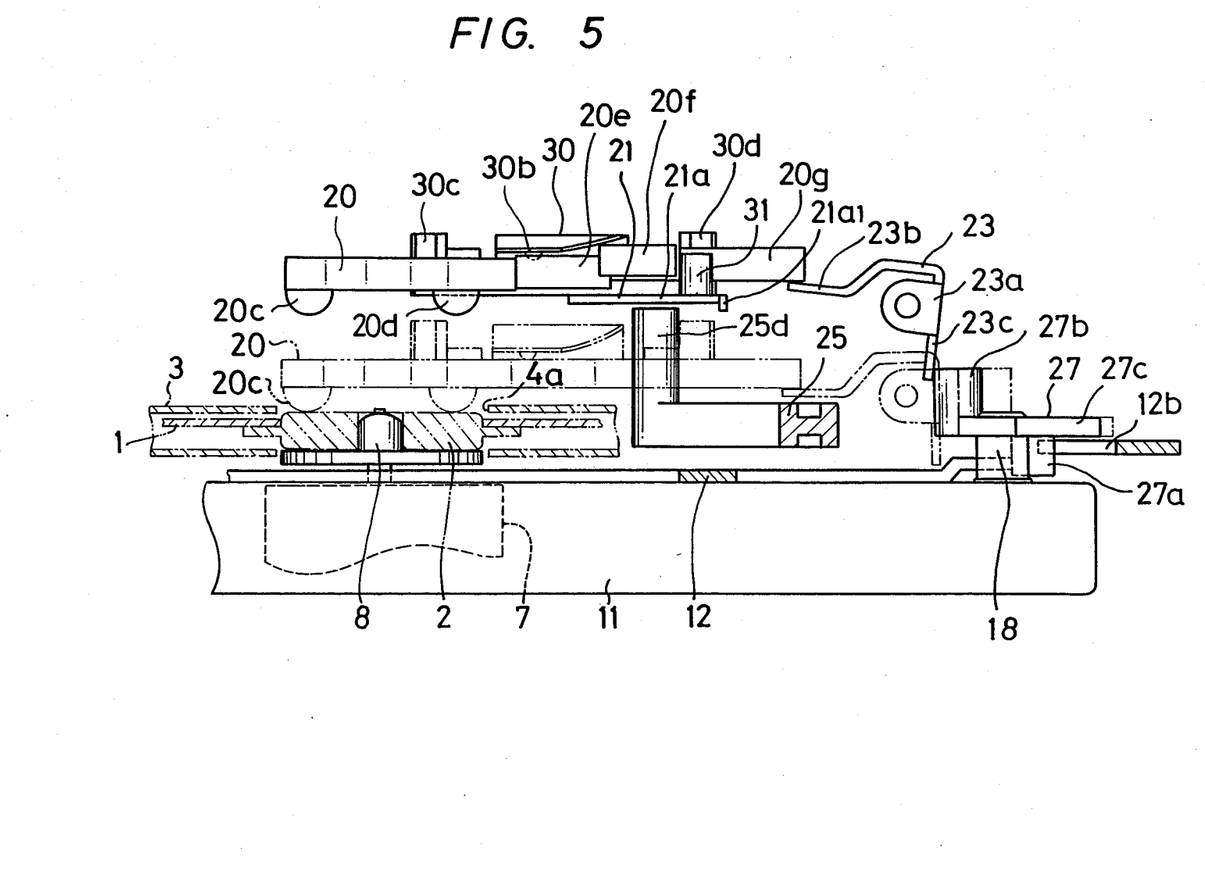
FIG. 5 is a cross-sectional view taken along a line B—B in FIG. 3.

The lift up arm 23 pivotally supported at the bearing members 13g, 13h formed at the rear edge portion of the disc holder 13 is formed of a support portion 23a, a pushing portion 23b elongated forward from the support portion 23a in the substantially horizontal direction to locate its top portion under the pushing arm 20g of the center core pressing arm 20 as shown in FIG. 5 and a contact member 23c extended substantially vertically from the rear portion of the support portion 23a in one side direction. The rear surface of the contact member 23c contacts with the projection 27b of the pressing arm 27 and the pushing piece member 12b of the slide chassis 12 (see FIGS. 4 and 5). In this case, the pushing piece member 12b of the slide chassis 12 contacts with the contact member 23c (See FIG. 4) under the condition that the disc holder 13 is moved downward as will be described later.

Though not shown, a pad member is mounted on the inner surface side of the pad attaching portion 14a of the pad plate 14 in correspondence with the magnetic head 9 located at the main chassis 11 side.

The main chassis 11, the slide chassis 12, the disc holder 13 and the pad plate 14, which are all constructed to have their predetermined members as described hereinabove, are sequentially assembled with corresponding relationships of respective members under the condition that the side plates 15, 16 are both fixed to the main chassis 11. Upon the assembly, the bearing portions 13i, 13j implanted on both side walls of the disc holder 13 at the front thereof are inserted into slit openings 14d, 14e (see FIG. 9) formed through the front side portions of the pad plate 14, hooks 13k, 13l formed at the rear side portions of the pad plate 14, hooks 13k, 13l are engaged with receiving portions 14f, 14g formed at the rear side portions of the pad plate 14, a connection shaft 33 (see FIG. 9) having at its central portion a curved portion 33a is inserted through the rectangular openings 13i1, 13j1, of the bearing members 13i, 13j of the disc holder 13 and the engage member 14c formed at the front edge of the pad plate 14 is engaged with the curved portion 33a of the connection shaft 33 from the under side, whereby the disc holder 13 and the pad plate 14 are linked together in the up and down direction.

The thus linked disc holder 13 and the pad plate 14 are mounted on the slide chassis 12 which can be slidably moved back and forth on main chassis through a predetermined range. The rollers 24a, 24b, 24c and 24d mounted on both side walls of the pad plate 14 are respectively opposed to the skewed cams 12d, 12e, 12f and 12g of the slide chassis 12. Also, the cam shafts of the skewed cams 12d, 12e, 12f and 12g are respectively opposed to the guide portions 15c, 15d, 16c and 16d vertically elongated from both side plates 15 and 16. Then, tension coil springs 34a and 34b are respectively stretched between the front lower portions of both side walls 15, 16 and engage members 13n, 13o protruded from side portions of the disc holder 13 as shown in FIGS. 7 and 8. Whereas, tension coil springs 34c and 34d are respectively extended between the rear lower portions of both side walls 15, 16 and engage openings 14h, 14i formed through the side portions of the pad plate 14, thus to spring-bias the disc holder 13, the pad plate 14 and so on downwards. Thus, the rollers 24a, 24b, 24c and 24d of the pad plate 14 are rotatably made in contact with the skewed cams 12d, 12e, 12f and 12g of the slide chassis 12 as shown in FIG. 7.

Screws 35a, 35b are respectively inserted into the side portions of the pad plate 14 to oppose reference pins 36a, 36b protruded from both side portions of the main chassis 11 in the axial direction to adjust the downward movement of the pad plate 14 as shown in FIG. 7.

In this way, the slide chassis 12, the disc holder 13 and the pad plate 14 are assembled onto the main chassis 11, as shown in FIG. 7, which are then housed into an outer housing (not shown) in that state.

The operation of the thus constructed disc loading apparatus will be described next.

Under the state that the disc cartridge 3 of the magnetic disc 1 is not loaded on the disc loading apparatus, as shown in FIG. 3, the rotatable arm 25 is rotated forward by the biasing force of the torsion spring 26. In this state, the slide chassis 12, slidably moved backward against the biasing force of the torsion spring 29, is locked by the engagement of the cam follower 19 with the arc cam 25b and the engage projection 25c of the rotatable arm 25. Under this state, as shown in FIGS. 3 and 5, the contact projection 27a of the pressing arm 27 is rotated against the biasing force of a torsion spring (not shown) by the projection member 12c of the slide chassis 12 and hence the other end projection 27b of the pressing arm 27 pushes the contact member 23c of the lift up arm 23. Accordingly, the lift up arm 23 is rotated around the support portion 23a and hence, its pushing member 23b is raised up. As a result, the center core pressing arm 20 is rotatably lifted up against the biasing force of the pressing spring member 30b of the leaf spring member 30 by the pushing member 23b through its pushing arm 20g. Under this condition, one end portion 21a of the protect arm 21, which is rotatably spring-biased by the torsion spring 32, is brought to the under side of the pushing surface portion 20f of the center core pressing arm 20 and the engage projection 31 of the protect arm 21 contacts with the side edge of the pushing surface portion 20f of the center core pressing arm 20.

Under the condition that the slide chassis 12 is slidably moved backward and then locked as described hereinabove, the skewed cams 12d, 12e, 12f and 12g of the slide chassis 12 are respectively made in contact with the rollers 24a, 24b, 24c and 24d at their high edge portions so that the pad plate 14 together with the disc holder 13 is lifted up against the biasing forces of the tension coil springs 34a, 34b, 34c and 34d as shown by solid lines in FIG. 7. In this state, the pressing projection 25d of the rotatable arm 25 is located within the frame portion 13c of the disc holder 13.

When the insertion of the magnetic disc cartridge 3 into the frame portion 13c of the disc holder 13 is started, the rear end face of the disc cartridge 13 collides with the pushing projection 25d of the rotatable arm 25. If this insertion of the magnetic disc cartridge 3 is continuously carried out, the rotatable arm 25 is rotated against the biasing force of the torsion spring 26. When the disc cartridge 3 is inserted into the innermost portion of the frame portion 13c of the disc holder 13, the rotatable arm 25 is rotated by a large amount. Then, the arc cam 25b of the rotatable arm 25 disengages from the engage projection 19 of the slide chassis 12 to release the slide chassis 12 from locking, as shown in FIG. 4.

When the disc cartridge 3 is inserted into the frame portion 13c of the disc holder 13, the slide shutter 6 of the disc cartridge 3 is opened to allow the magnetic disc 1 to appear in part to the outside through the windows 5a,5b as illustrated in FIG. 1. The lower surface of the exposed portion of the magnetic disc 1 is opposed through the window aperture 12i of the slide chassis 12 to the window aperture 11b of the main chassis 11, or the magnetic head 9. While the upper surface of the exposed portion of the magnetic disc 1 is opposed through the window 13d of the disc holder 13 to the pad member (not shown) mounted to the pad plate 14.

Then, the slide chassis 12 is released from locking as described hereinabove and is spring-biased forward by the biasing force of the torsion spring 29, whereby the pressing arm 27 is released from being pressed by the projection member 12c and rotated by the biasing force of the torsion spring 29 to disengage from the lift up arm 23. Consequently, the lift up arm 23 is made freely rotatable to release the pressing for the center core pressing arm 20, or to release the locking. Accordingly, the center core pressing arm 20 is spring-biased toward the main chassis 11 by the biasing force of the spring member 30b with the result that the projections 20c, 20d of the center core pressing arm 20 push via the window 13d the center core 2 through the opening 4a of the disc cartridge 3 (as shown by two-dot chain lines in FIG. 5).

In this operation, or when the slide chassis 12 is slidably moved forward, as shown by two-dot chain lines in FIG. 7, the skewed cams 12d, 12e, 12f and 12g of the slide chassis 12 contact with the rollers 24a, 24b, 24c and 24d of the pad plate 14 at their skewed rear edges 12d1, 12e1, 12f1, and 12g1 so that the disc holder 13 and the pad plate 14 are both spring-biased toward the main chassis 11 by the tension coil springs 34a, 34b, 34c and 34d. At the same time, the disc cartridge 3 is moved downward to allow the center core 2 to oppose the disc spindle 8 projected from the central opening 12h of the slide chassis 12. Then, the center core 2 is pressed by the center core pressing arm 20 so as to be engaged with the disc spindle 8 as described before (as shown by two-dot chain lines in FIGS. 5 and 6).

The down movement of the disc holder 13 and the pad plate 14 is restricted by the contact between the screws 35a, 35b and the reference pins 36a, 36b formed at the main chassis 11 side. After they contact with one another, the disc holder 13 and the pad plate 14 are kept at the predetermined positions regardless of the forward sliding movement of the slide chassis 12.

Figure 6:
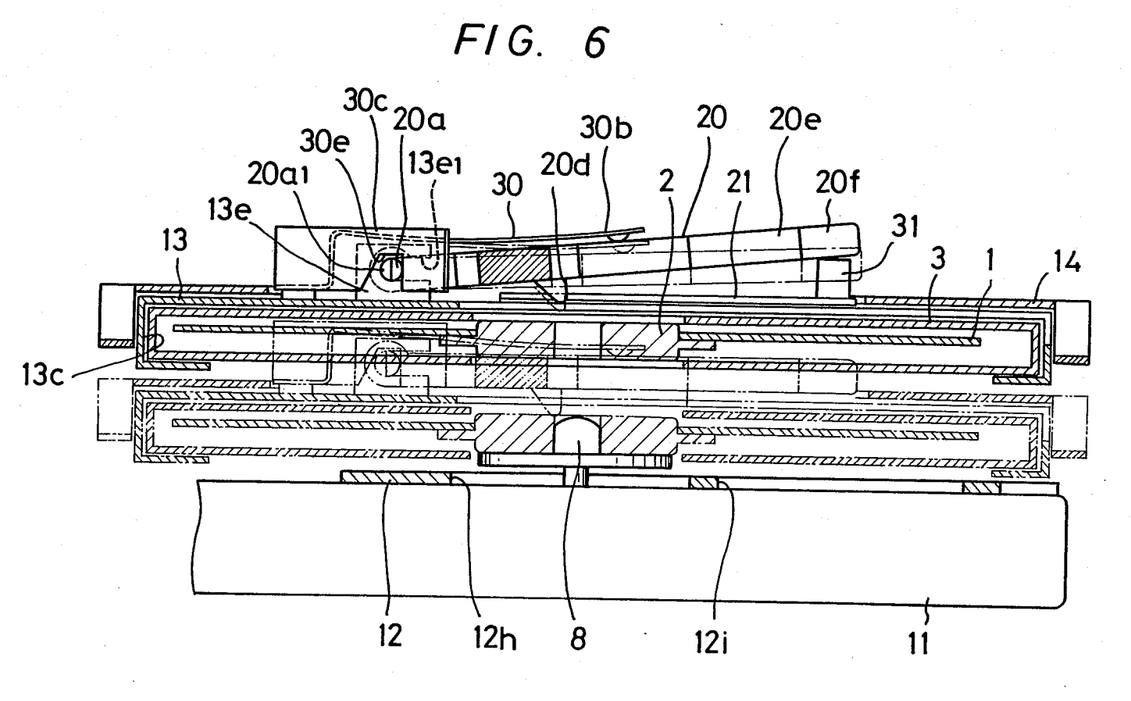
FIG. 6 is a cross-sectional view taken along a line C—C of FIG. 4.

When the slide chassis 12 is further slidably moved forward the pushing member 12b of the slide chassis 12 pushes the contact member 23c of the lift up arm 23 forward substantially so that the lift up arm 23 is rotated to raise its pushing member 23b. Since this raised amount of the pushing member 23b is larger than the aforementioned initial raised amount, the center core pressing arm 20 is lifted upward very high at its pushing arm 20g, whereby the protect arm 21 enters into the more inner side of the center core pressing arm 20 and as illustrated in FIG. 6, the engage projection 31 of the protect arm 21 opposes the lower surface side of the pushing surface portion 20f of the center core pressing arm 20 to place the center core pressing arm 20 in the locking state. Under this state, even if the slide chassis 12 is slidably moved backward halfway, or slidably moved so as not to cause the eject operation which will be described later, the locking state of the center core pressing arm 20 can be maintained so long as the protect arm 21 is not rotated.

When the center core pressing arm 20 is lifted up so high as described hereinabove, the projections 20c, 20d of the center core pressing arm 20 are disengaged from the center core 2 so that the center core 2, or the magnetic disc 1 is rotated very smoothly by the disc spindle 8 without any resistance the recording and/or reproducing being properly carried out by the slidable contact of the magnetic head 9.

In this case, the contact portion 21b1 on the other end portion 21b of the protect arm 21 exists on the locus along which the pressing projection 25d of the rotatable arm 25 rotates. Also, the engage projection 19 of the slide chassis 12 is made in close contact with the inside edge of one-half portion of the rotatable arm 25.

The eject operation for ejecting the disc cartridge 3 after the end of the recording and/or reproducing operation is carried out as follows.

When the slide chassis 12 is slidably moved backward against the biasing force of the torsion spring 29 by strongly depressing a button 37 mounted on the pressing member 12a of the slide chassis 12 (see FIGS. 7 and 8), the skewed cams 12d, 12e, 12f and 12g cause the pad plate 14 together with the disc holder 13 to be lifted up against the biasing forces of the torsion coil springs 34a, 34b, 34c and 34d through the rollers 24a, 24b, 24c and 24d. While the pressing member 12b of the slide chassis 12 is disengaged and apart backward from the contact member 23c of the lift up arm 23, the lift up arm 23 is freely rotatable so that the center core pressing arm 20 is released from being lifted up by the pressing arm 23b of the lift up arm 23. In this state, the engage projection 31 of the protect arm 21 is located under the pushing surface portion 20f of the center core pressing arm 20 to push up the center core pressing arm to push up the center core pressing arm 20 so that the center core pressing arm 20 is locked at its lifted-up position. Accordingly, the center core pressing arm 20 cannot press the center core 2 any more. Hence, the center core 2 can easily be ejected from the disc spindle 8 by the pushing operation of the disc holder 13.

When the slide chassis 12 is slidably moved to the rear end, the engage projection 19 of the slide chassis 12 is disengaged from the inner side edge of one half portion of the rotatable arm 25, allowing the torsion spring 26 to rotate the rotatable arm 25 forward by its biasing force. In this case, the projection member 12c of the slide chassis 12 pushes the pressing arm 27 to rotate so that the lift up arm 23 maintains its lifting member 23b in the raised state.

Under this state, when the rotatable arm 25 is rotated, the pressing projection 25d of the rotatable arm 25 pushes the disc cartridge 3 to move the same forward within the frame portion 13c of the disc holder 13. While the rotatable arm 25 is being rotated, the pressing projection 25d of the rotatable arm 25 collides with the contact portion 21b1 of the protect arm 21 to cause the protect arm 21 to be rotated against the biasing force of the torsion spring 32, whereby the engage projection 31 of the protect arm 21 is disenaged from the lower surface of the pushing surface portion 20f of the center core pressing arm 20. In this way, the center core pressing arm 20 is released from locking due to the above-mentioned operation. In this case, however, since the lift arm 23 is rotated so as to raise its pushing member 23b as earlier noted, the lift-up arm 20g of the center core pressing arm 20 contacts with the pushing member 23b and the center core pressing arm 20 is kept in its lifted-up condition, or the center core pressing arm 20 is returned to the initial stroke. Thus, the projections 20c, 20d of the center core pressing arm 20 are disengaged from the disc cartridge 3 (FIG. 8) so that the disc cartridge 3 can be ejected satisfactorily.

As described above, the rotatable arm 25 is rotated, and is stopped in rotation when the engage projection portion 25c thereof collides with the engage projection 19 of the slide chassis 12. Under this state, the disc cartridge 3 is ejected from the disc loading apparatus. Whereas, under the condition that the slide chassis 12 is slidably moved to the rear end, the slide chassis 12 is locked by engaging its engage projection 19 with the arc cam 25b and the engage projection 25c of the rotatable arm 25 and then returned to the initial condition shown in FIG. 3 on the whole.

Before the disc cartridge 3 is loaded onto the disc loading apparatus of the recording and/or reproducing apparatus, the center core pressing arm 20 is maintained at the predetermined lifted-up position to thereby enable the insertion of the disc cartridge 3 to be carried out smoothly as described hereinabove. When the insertion of the disc cartridge 3 is ended, the slide chassis 12 is slidably moved forward to allow the center core pressing arm 20 to start moving toward the main chassis 11 to contact with the center core 2 of the magnetic disc 1. When the disc holder 13 holding thereon the disc cartridge 3 is moved downward, the contacting force of the center core pressing arm 20 with the center core 2 is increased and this contacting force is maximized at the position in which the disc holder 13 is moved downward to its lowest position to engage the center core 2 with the disc spindle 8 positively. When the center core 2 of the magnetic disc 1 is engaged with the disc spindle 8 positively and the slide chassis 12 is further slid forward, the center core pressing arm 20 is lifted up to disengage itself from the center core 2, which fact enables the magnetic disc 1 to be rotated satisfactorily.

According to the present invention, as described above, the loading operation of the magnetic disc 1 is carried out positively at proper timing in which the disc holder 13 with the disc cartridge 3 held thereon is moved toward the main chassis 11, the center core 2 is engaged with the disc spindle 8 by the pressing operation of the center core pressing arm 20 and the center core pressing arm 20 is released from its pressing after the center core 2 was engaged with the disc spindle 8. Accordingly, the magnetic disc 1 can be smoothly moved into the recording and/or reproducing operation of the magnetic disc 1.

The eject operation for ejecting the magnetic disc 1 will be summarized as follows.

When the disc holder 13 is lifted upwards in association with the insertion slidable movement of the slide chassis 12, the center core pressing arm 20 is lifted up with a large stroke during a predetermined period after the disc holder 13 started ascending. Thereafter, though the lifting-up stroke of the center core pressing arm 20 is reduced, the lifted-up condition of the center core pressing arm 20 is maintained. Thus, since no pressure is applied to the center core 2, the disc cartridge 3 can be smoothly ejected from the moved-up disc holder 13.

According to the present invention, as set forth above, in association with the insertion of the magnetic disc into the disc holder, the center core pressing arm, which presses the center core of the magnetic disc to the rotation drive section (or disc spindle) is locked up by the lock member under the condition that it is disengaged from the pressed surface of the center core. This locking state is release when the insertion of the magnetic disc is ended, and the center core pressing arm is operated to press the center core only at this lock releasing time point. Therefore, not only in the recording and/or reproducing operation, but also in the mis-operation of the eject member and in the loading operation, the center core pressing arm does not contact with the center core, so that the magnetic disc can be rotated and unloaded positively and smoothly.

Further, according to the present invention, as described above, the disc holder holding thereon the disc cartridge of the magnetic disc is disengaged from the rotation drive section side (disc spindle side) and the disc cartridge is taken out of the disc holder by operating the pressing member at proper timing. Then, the disc cartridge is taken out of the disc holder by the pressing arm after the disc holder was moved apart from the rotation drive section side up to the predetermined position. Therefore, upon loading, the magnetic disc can always be ejected positively and the disc holder and the pressing arm can be operated at proper timing only by the operation member.

The above description is given on a single preferred embodiment of the invention but it will be apparent that many modifications and variations could be effected by one skilled in the art without departing from the spirit and scope of the novel concepts of the invention so that the scope of the invention should be determined by the appended claims only.

I claim as my invention:

1. A disc loading apparatus comprising a main chassis having a disc spindle and a signal transducer, a slide chassis mounted on the main chassis for sliding movement between a first position and a second position, means biasing the slide chassis toward the first position, a disc holder being mounted on said main chassis for movement between a first position spaced away from said main chassis and a second position adjacent said main chassis, means for biasing said disc holder toward the second position, means for moving said disc holder to said first position against said means for biasing, a rotary arm being mounted on the main chassis for pivoting between a first and second position, said rotary arm having an arcuate cam surface formed thereon, said cam surface coacting with a stop on the slide chassis to lock the slide chassis in said second position when the rotary arm is in its second position, means biasing the rotary arm to said second position, a center core pressing arm being mounted on the disc holder for pivotable movement, spring means biasing the center core pressing arm toward the main chassis for pressing a center core of a disc cassette toward said disc spindle of the main chassis temporarily during insertion of the cassette into said apparatus, a protect arm cooperating with the rotary arm and the center core pressing arm for preventing the pressing action of the center core pressing arm against said center core, and means mounted on said disc holder cooperating with said slide chassis for lifting said center core pressing arm into a disengaged position when the slide chassis is in each of said first and second positions but releasing said center core pressing arm as the slide chassis moves between said first and second positions so that on inserting a disc cartridge into the disc holder, said rotatable arm is engaged and moved to a position to release said slide chassis to move toward said first position.

2. A disc loading apparatus according to claim 1, wherein said means for lifting the center core pressing arm includes a lift-up link pivotably mounted on said disc holder having a portion being engaged by the slide chassis when the slide chassis is in said first position.

3. A disc loading apparatus according to claim 1, wherein the means for moving the disc holder to the first position spaced away from said main chassis includes cam surfaces provided on said slide chassis coacting with rollers provided on said disc holder so that with movement of the slide chassis from the first position to the second position, said cam and rollers coact to shift the disc holder from a second position adjacent the main chassis to a first position spaced from said main chassis.

4. A disc loading apparatus according to claim 3, which includes means connected to the slide chassis for shifting the chassis from the first toward the second position to cause the disc holder to be raised to the first position and to move the stop to a position to release the rotary arm to start a discharge of the disc cassette and to position the arcuate cam surface in a position to hold the slide chassis in said second position.

* * * * *